United States Patent
Ochi et al.

(10) Patent No.: US 11,643,533 B2
(45) Date of Patent: May 9, 2023

(54) FILM, METHOD OF PRODUCING FILM, AND BAG

(71) Applicant: SUMITOMO CHEMICAL COMPANY, LIMITED, Tokyo (JP)

(72) Inventors: Naoko Ochi, Chiba (JP); Hiroshi Toyoda, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 139 days.

(21) Appl. No.: 17/197,320

(22) Filed: Mar. 10, 2021

(65) Prior Publication Data

US 2021/0284829 A1   Sep. 16, 2021

(30) Foreign Application Priority Data

Mar. 12, 2020   (JP) .............................. JP2020-042935

(51) Int. Cl.

| | |
|---|---|
| *B29C 48/00* | (2019.01) |
| *B29C 48/08* | (2019.01) |
| *B29C 48/67* | (2019.01) |
| *C08L 23/08* | (2006.01) |
| *B29K 23/00* | (2006.01) |
| *B29L 31/00* | (2006.01) |

(52) U.S. Cl.
CPC ...... *C08L 23/0815* (2013.01); *B29C 48/0011* (2019.02); *B29C 48/022* (2019.02); *B29C 48/08* (2019.02); *B29C 48/67* (2019.02); *B29K 2023/08* (2013.01); *B29K 2995/0063* (2013.01); *B29L 2031/7128* (2013.01); *C08L 2203/162* (2013.01)

(58) Field of Classification Search
CPC ...... C08L 23/00; C08L 23/02; C08L 23/0815; C08L 2203/16; C08L 2203/162; B29K 2023/08; B29K 2995/0063; B29L 2031/74128

See application file for complete search history.

(56) References Cited

U.S. PATENT DOCUMENTS

| | | |
|---|---|---|
| 2002/0176952 A1 | 11/2002 | Yasaka et al. |
| 2009/0018299 A1 | 1/2009 | Tasaki et al. |
| 2019/0382515 A1 | 12/2019 | Ochi et al. |

FOREIGN PATENT DOCUMENTS

| | | | |
|---|---|---|---|
| JP | 2020132877 A | * | 8/2020 |
| WO | 2018164169 A1 | | 9/2018 |

* cited by examiner

*Primary Examiner* — Irina S Zemel
*Assistant Examiner* — Jeffrey S Lenihan
(74) *Attorney, Agent, or Firm* — Meunier Carlin & Curfman LLC

(57) ABSTRACT

Provided are a film having an excellent balance between heat seal strength and opening strength, a method of producing the film, and a bag obtained by heat-sealing the film. According to the present invention, there is provided a film containing a resin, wherein a resin density of the film is 860 kg/m³ or more and less than 900 kg/m³, and on at least one surface of the film, an arithmetic mean height Sa satisfies the following Expression [1]:

$0.10 \ \mu m \le Sa \le 0.50 \ \mu m$ [1], and a minimum autocorrelation length Sal satisfies the following Expression [2]:

$0.2 \ \mu m \le Sal \le 10.4 \ \mu m$ [2].

13 Claims, 2 Drawing Sheets

FILM, METHOD OF PRODUCING FILM, AND BAG

CROSS-REFERENCE TO RELATED APPLICATIONS

This application is a US non-provisional application, which claims the benefit of priority to Japanese Patent Application No. 2020-042935, filed Mar. 12, 2020, the content of which is incorporated herein by reference in its entirety.

BACKGROUND OF THE INVENTION

Field of the Invention

The present invention relates to a film, a method of producing the film, and a bag obtained by heat-sealing the film.

Description of the Related Art

A laminated film obtained by stacking (laminating) a base film and a sealant film has been widely used as a film for packing objects to be packaged such as foods and detergents. The sealant film is required to have excellent heat sealability, slipperiness, transparency, and strength. As the sealant film having such properties, a film containing an ethylene-α-olefin copolymer has been recently proposed (for example, WO 2018/164169).

SUMMARY OF THE INVENTION

As a bag packing objects to be packaged, bags having an opening obtained by heat-sealing peripheral edges of two films (for example, a two-sided bag, a three-sided bag, a folded-bag, a bottom seal bag, a four-sided seal bag, a standing pouch, a pillow bag, and the like) are known. A film used in such bags is required to have a low opening strength, from the viewpoint of easily peeling off two films that are in close contact with each other at the opening of the bag, in addition to high heat seal strength. However, a film focusing on a balance between heat seal strength and opening strength has not been studied in the related art.

An object of the present invention is to provide a film having an excellent balance between heat seal strength and opening strength, a method of producing the film, and a bag obtained by heat-sealing the film.

According to the present invention, there is provided a film containing a resin, wherein a resin density of the film is 860 kg/m³ or more and less than 900 kg/m³, and on at least one surface of the film, an arithmetic mean height Sa satisfies the following Expression [1]:

$$0.10 \ \mu m \leq Sa \leq 0.50 \ \mu m \quad [1],$$

and a minimum autocorrelation length Sal satisfies the following Expression [2]:

$$0.2 \ \mu m \leq Sal \leq 10.4 \ \mu m \quad [2].$$

According to the present invention, there is provided a method of producing a film, the method including: melt-kneading and extruding a mixture using an extruder equipped with a screw, the mixture being a mixture of an ethylene-α-olefin copolymer (1) having a monomer unit based on ethylene and a monomer unit based on an α-olefin having 3 to 20 carbon atoms, having a density of 915 kg/m³ or more and 950 kg/m³ or less, and having a melt flow rate of 0.0001 g/10 min or more and 0.2 g/10 min or less measured under conditions of a temperature of 190° C. and a load of 21.18 N, and an ethylene-α-olefin copolymer (2) having a monomer unit based on ethylene and a monomer unit based on an α-olefin having 3 to 20 carbon atoms, having a density of 850 kg/m³ or more and less than 890 kg/m³, and having a melt flow rate of 0.1 g/10 min or more and 10 g/10 min or less measured under conditions of a temperature of 190° C. and a load of 21.18 N; and forming a film of the extruded mixture, wherein the screw includes a compression section which compresses and kneads the mixture, and sends the obtained mixture to a downstream side, the compression section includes a rotary main shaft and a spiral blade spirally formed on an outer circumference of the rotary main shaft, the rotary main shaft has spiral groove portions constituting a spiral groove arranged between pitches of the spiral blade, and the spiral groove portion has a first region in which a groove depth gradually increases in a moving direction of the mixture and a second region in which the groove depth gradually decreases in the moving direction of the mixture.

According to the present invention, there is provided a bag obtained by heat-sealing the film.

According to the present invention, it is possible to provide a film having an excellent balance between heat seal strength and opening strength, a method of producing the film, and a bag obtained by heat-sealing the film.

DETAILED DESCRIPTION OF THE PREFERRED EMBODIMENTS

Figure 1:
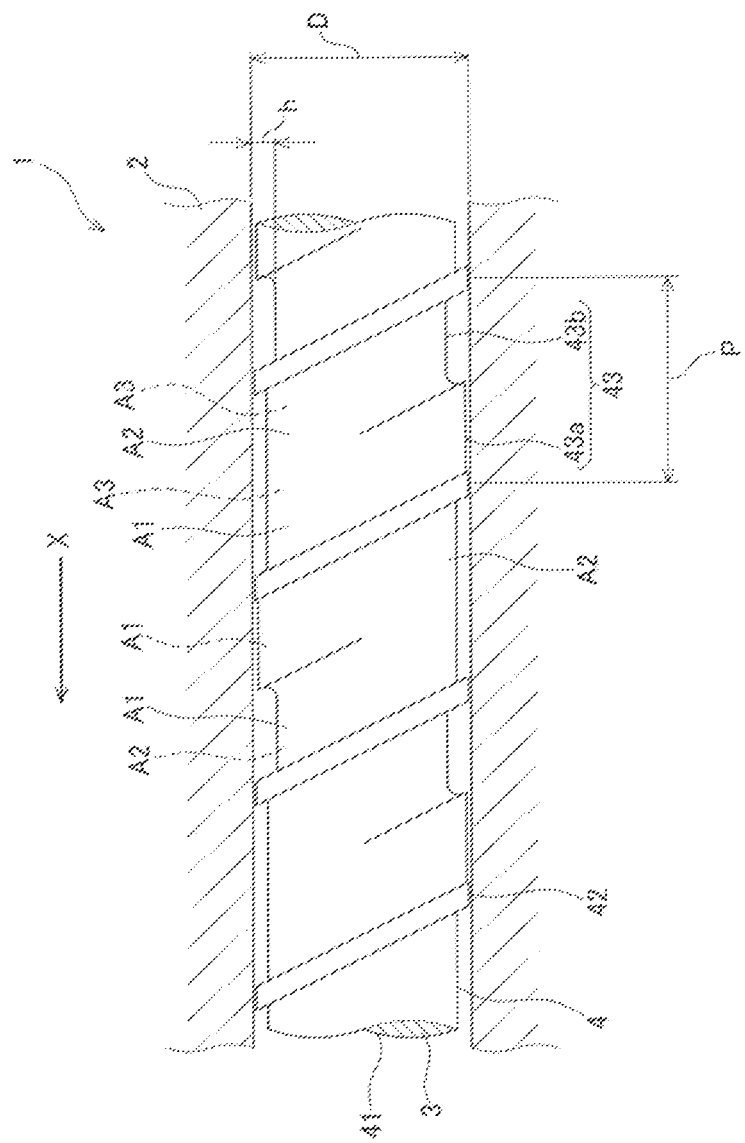
FIG. 1 is a view schematically illustrating a part of a compression section of a screw in the present embodiment.

Hereinafter, embodiments of the present invention will be described, but the present invention is not limited to the following embodiments.

Definition

Herein, the following terms are defined or explained as follows.

The term "ethylene-based polymer" refers to a polymer having a monomer unit based on ethylene, and refers to a polymer in which a content of a monomer unit based on ethylene is 50% by mass or more when a total mass of the polymer is 100% by mass.

The term "ethylene-α-olefin copolymer" refers to a copolymer having a monomer unit based on ethylene and a monomer unit based on an α-olefin, and refers to a copolymer in which a total content of a monomer unit based on ethylene and a monomer unit based on an α-olefin is 95% by mass or more when a total mass of the copolymer is 100% by mass.

The term "α-olefin" refers to a linear or branched olefin having a carbon-carbon unsaturated double bond at the α position.

The term "ethylene-based resin composition" refers to a composition containing an ethylene-based polymer.

The term "lubricant" refers to an agent having an action of reducing a friction coefficient of a material to which the agent is added.

The term "anti-blocking agent" refers to an agent having a function of preventing films from sticking, adhering, or fusing to each other, and thus not being peeled off, during storage or use of the film.

Herein, a density refers to a value (unit: kg/m$^3$) measured according to the method A specified in JIS K7112-1980 after performing annealing described in JIS K6760-1995.

Herein, a melt flow rate (hereinafter, also referred to as an MFR) refers to a value (unit: g/10 min) measured under conditions of a temperature of 190° C. and a load of 21.18 N according to the method A specified in JIS K7210-1995.

Herein, a number average molecular weight (hereinafter, also referred to as Mn) and a weight average molecular weight (hereinafter, also referred to as Mw) are determined by a gel permeation chromatograph (GPC) method. In addition, GPC measurement is performed under the following conditions.

- GPC apparatus: HLC-8121GPC/HT (manufactured by Tosoh Corporation)
- GPC column: three TSKgelGMH$_6$-HTs (manufactured by Tosoh Corporation)
- Measurement temperature: 140° C.
- Solvent and mobile phase: ortho-dichlorobenzene containing 0.05% by mass of dibutyl hydroxytoluene (Wako Pure Chemical Industries, special grade)
- Mobile phase flow rate: 1.0 mL/min
- Injection amount: 300 μL
- Detector: differential refractometer
- Molecular weight standard material: standard polystyrene
- Data reading interval: 2.5 seconds Film A film according to the present embodiment contains a resin. A resin density of the film is 860 kg/m$^3$ or more and less than 900 kg/m$^3$ and preferably 890 kg/m$^3$ or more and less than 900 kg/m$^3$.

Herein, the "resin density" refers to a density of a resin component contained in the film. The film may contain an inorganic component. When the film does not contain an inorganic component, a density of the film is a resin density of the film. When the film contains an inorganic component, a density of the resin component obtained by removing the inorganic component from the film is a resin density. The resin component refers to a component other than the inorganic component in the film.

The resin density of the film can be determined based on a mass ratio of the resin contained in the film after measuring the density by the method described above.

The resin density of the film can be controlled in a range of 860 kg/m$^3$ or more and less than 900 kg/m$^3$, for example, by adjusting a content or density of an ethylene-α-olefin copolymer (1) or an ethylene-α-olefin copolymer (2) described below.

In the film according to the present embodiment, on at least one surface of the film, an arithmetic mean height Sa satisfies the following Expression [1]:

$$0.10 \, \mu m \leq Sa \leq 0.50 \, \mu m \quad [1], \text{ and}$$

a minimum autocorrelation length Sal satisfies the following Expression [2]:

$$0.2 \, \mu m \leq Sal \leq 10.4 \, \mu m \quad [2].$$

Here, the arithmetic mean height refers to Sa specified in ISO25178-2. Sa can be determined by the following method. First, a surface of the film is measured with an objective lens at a magnification of 110 times using a white-light interference microscope (manufactured by Hitachi High-Technologies Corporation). Next, the obtained image having a visual field size of 80 μm×60 μm is subjected to a surface correction (inclination correction) using a VS-viewer (manufactured by Hitachi High-Technologies Corporation). Specifically, a surface having the smallest sum of squares of absolute values of unevennesses in a Z direction of a sample surface is calculated, and the surface correction is performed to make the inclined sample surface horizontal. Furthermore, the image subjected to the surface correction is processed by using a value of S-Filter specified in ISO25178-2. Specifically, filter processing is performed with a lateral period limit (½ of optical resolution, 0.17 μm) as a cut-off value, and a noise of a short-wavelength component is removed. Sa specified in ISO25178-2 can be determined from the processed image.

The arithmetic mean height Sa on the at least one surface of the film preferably satisfies the following Expression [1']:

$$0.10 \, \mu m \leq Sa \leq 0.20 \, \mu m \quad [1'].$$

In addition, the minimum autocorrelation length refers to Sal specified in ISO25178-2. Sal can be determined from the image processed by the same method as that of the arithmetic mean height Sa.

The minimum autocorrelation length Sal on the at least one surface of the film preferably satisfies the following Expression [2']:

$$7.0 \, \mu m \leq Sal \leq 10.4 \, \mu m \quad [2'].$$

The arithmetic mean height Sa can be controlled in a range of $0.10 \, \mu m \leq Sa \leq 0.50 \, \mu m$ by adjusting a processing temperature of the film in a method of producing a film described below using a screw 3 having a spiral groove portion 43 in a compression section 4, the spiral groove portion 43 having a first region A1 in which a groove depth gradually increases in a moving direction of a mixture and a second region A2 in which the groove depth gradually decreases in the moving direction of the mixture. More specifically, Sa can be set to 0.50 μm or less by setting the processing temperature of the film to 180° C. or lower.

The minimum autocorrelation length Sal can be controlled in a range of $0.2 \, \mu m \leq Sal \leq 10.4 \, \mu m$ by adjusting a content of an ethylene-α-olefin copolymer (1) described below in a method of producing a film described below using a screw 3 having a spiral groove portion 43 in a compression section 4, the spiral groove portion 43 having a first region A1 in which a groove depth gradually increases in a moving direction of a mixture and a second region A2 in which the groove depth gradually decreases in the moving direction of the mixture. More specifically, Sal can be set to 0.2 μm or more by setting the content of the ethylene-α-olefin copolymer (1) to 5% by mass or more.

In addition, Sal can be set to 10.4 μm or less by setting the content of the ethylene-α-olefin copolymer (1) to 25% by mass or less.

As one aspect of the present embodiment, a resin density of the film is 890 kg/m$^3$ or more and less than 900 kg/m$^3$, and on at least one surface of the film, an arithmetic mean height Sa satisfies the following Expression [1']:

$$0.10 \, \mu m \leq Sa \leq 0.50 \, \mu m \quad [1], \text{ and}$$

a minimum autocorrelation length Sal satisfies the following Expression [2']:

$$7.0 \, \mu m \leq Sal \leq 10.4 \, \mu m \quad [2].$$

The film has a more preferred balance between heat seal strength and opening strength.

$$0.10 \, \mu m \leq Sa \leq 0.20 \, \mu m \quad [1'].$$

$$7.0 \, \mu m \leq Sal \leq 10.4 \, \mu m \quad [2'].$$

The resin contained in the film according to the present embodiment is preferably a mixture of an ethylene-α-olefin copolymer (1) having a monomer unit based on ethylene and a monomer unit based on an α-olefin having 3 to 20 carbon atoms, having a density of 915 kg/m$^3$ or more and 950 kg/m$^3$ or less, and having a melt flow rate of 0.0001 g/10 min or more and 0.2 g/10 min or less measured under conditions of a temperature of 190° C. and a load of 21.18 N, and an ethylene-α-olefin copolymer (2) having a monomer unit based on ethylene and a monomer unit based on an α-olefin having 3 to 20 carbon atoms, having a density of 850 kg/m$^3$ or more and less than 890 kg/m$^3$, and having a melt flow rate of 0.1 g/10 min or more and 10 g/10 min or less measured under conditions of a temperature of 190° C. and a load of 21.18 N.

More preferably, the density of the ethylene-α-olefin copolymer (1) is 920 kg/m$^3$ or more and 935 kg/m$^3$ or less, the melt flow rate of the ethylene-α-olefin copolymer (1) measured under the conditions of the temperature of 190° C. and the load of 21.18 N is 0.001 g/10 min or more and 0.01 g/10 min or less, the density of the ethylene-α-olefin copolymer (2) is 880 kg/m$^3$ or more and less than 890 kg/m$^3$, and the melt flow rate of the ethylene-α-olefin copolymer (2) measured under the conditions of the temperature of 190° C. and the load of 21.18 N is 1 g/10 min or more and 5 g/10 min or less.

When the density of the ethylene-α-olefin copolymer (1) is 915 kg/m$^3$ or more and 950 kg/m$^3$ or less and the density of the ethylene-α-olefin copolymer (2) is 850 kg/m$^3$ or more and less than 890 kg/m$^3$, the resin density of the film can be 860 kg/m$^3$ or more and less than 900 kg/m$^3$.

In addition, when the density of the ethylene-α-olefin copolymer (1) is 920 kg/m$^3$ or more and 935 kg/m$^3$ or less and the density of the ethylene-α-olefin copolymer (2) is 880 kg/m$^3$ or more and less than 890 kg/m$^3$, the resin density of the film can be 890 kg/m$^3$ or more and less than 900 kg/m$^3$.

The content of the ethylene-α-olefin copolymer (1) is preferably 5% by mass or more and 25% by mass or less, and more preferably 8% by mass or more and 23% by mass or less, with respect to a total of 100% by mass of the content of the ethylene-α-olefin copolymer (1) and a content of the ethylene-α-olefin copolymer (2).

The content of the ethylene-α-olefin copolymer (2) is preferably 75% by mass or more and 95% by mass or less, and more preferably 77% by mass or more and 92% by mass or less, with respect to the total of 100% by mass of the content of the ethylene-α-olefin copolymer (1) and the content of the ethylene-α-olefin copolymer (2).

As one aspect of the present embodiment, there is provided a film in which a content of the ethylene-α-olefin copolymer (1) and a content of the ethylene-α-olefin copolymer (2) are 5% by mass or more and 25% by mass or less and 75% by mass or more and 95% by mass or less, respectively, with respect to a total of 100% by mass of the content of the ethylene-α-olefin copolymer (1) and the content of the ethylene-α-olefin copolymer (2).

When the content of the ethylene-α-olefin copolymer (1) and the content of the ethylene-α-olefin copolymer (2) are 5% by mass or more and 25% by mass or less and 75% by mass or more and 95% by mass or less, respectively, with respect to the total of 100% by mass of the content of the ethylene-α-olefin copolymer (1) and the content of the ethylene-α-olefin copolymer (2), the resin density of the film can be 860 kg/m$^3$ or more and less than 900 kg/m$^3$.

A method of producing a resin is not particularly limited, and examples thereof can include known blending methods.

Examples of the known blending method can include a method of dry blending each copolymer and a method of melt-blending each copolymer. Examples of the dry blending method can include methods using various blenders such as a Henschel mixer and a tumbler mixer. Examples of the melt-blending method can include methods using various mixers such as a single screw extruder, a twin screw extruder, a Banbury mixer, and a heat roll.

A film having excellent slipperiness can be obtained using a mixture of the ethylene-α-olefin copolymer (1) and the ethylene-α-olefin copolymer (2) as the resin. The ethylene-α-olefin copolymer (1) can be used as a slip modifier.

The film according to the present embodiment may contain a lubricant and/or an anti-blocking agent. In addition, the film may contain an antioxidant, a neutralizing agent, a weather-resistant agent, an antistatic agent, an anti-fogging agent, a non-dripping agent, a pigment, or a filler, as an additive.

In a case where the film according to the present embodiment contains a lubricant and/or an anti-blocking agent, a content thereof is preferably 5.0% by mass or less, more preferably 4.0% by mass or less, still more preferably 3.0% by mass or less, and particularly preferably 2.0% by mass or less, with respect to the total of 100% by mass of the content of the ethylene-α-olefin copolymer (1) and the content of the ethylene-α-olefin copolymer (2). It is preferable that the film according to the present embodiment substantially does not contain a lubricant and/or an anti-blocking agent.

The film according to the present embodiment may be a single-layered film including only a layer (hereinafter, also referred to as a layer α) formed of a film in which a resin density is 860 kg/m$^3$ or more and less than 900 kg/m$^3$, and on at least one surface of the film, an arithmetic mean height Sa satisfies Expression [1] and a minimum autocorrelation length Sal satisfies Expression [2], or may be a multi-layered film including the layers a. In a case where the film is a multi-layered film, the multi-layered film may be a multi-layered film including two surface layers in which at least one surface layer is a layer α, and on at least one surface of the multi-layered film, an arithmetic mean height Sa satisfies Expression [1] and a minimum autocorrelation length Sal satisfies Expression [2].

The film is a multi-layered film including a layer α and a layer β containing an ethylene-based polymer (the layer β is different from the layer α). The film may be a multi-layered film including two surface layers in which at least one surface layer is the layer α.

The film is a multi-layered film including a layer α and a layer γ that does not contain an ethylene-based polymer (the layer γ is different from the layer α). The film may be a multi-layered film including two surface layers in which at least one surface layer is the layer α.

In the multi-layered film, an example of the ethylene-based polymer contained in the layer β can include an ethylene-α-olefin copolymer containing no ethylene-α-olefin copolymer (1).

In the multi-layered film, examples of a material constituting the layer γ can include cellophane, paper, paperboard, fabric, an aluminum foil, a polyamide resin such as nylon 6 or nylon 66, a polyester resin such as polyethylene terephthalate or polybutylene terephthalate, and a polypropylene resin.

The multi-layered film including the layer α and the layer γ is a multi-layered film including two surface layers in which at least one surface layer is the layer α. Examples thereof can include a double-layered film including a layer α and a layer γ in which one surface layer is the layer α and the other surface layer is the layer γ.

The multi-layered film including the layer α and the layer γ is a multi-layered film including two surface layers in which at least one surface layer is the layer α. Examples thereof can include a multi-layered film including a layer α, a layer β, and a layer γ in which one surface layer is the layer α and the other surface layer is the layer γ.

Examples of a method of producing a single-layered film or a multi-layered film can include an extrusion molding method such as an inflation film forming method or a T die film forming method, an injection molding method, and a compression molding method. The method of producing a single-layered film or a multi-layered film is preferably an inflation film forming method.

In a case where the multi-layered film is a multi-layered film including a layer α and a layer γ, as a method of producing the multi-layered film, a lamination method of laminating a single-layered film including only a layer α or a multi-layered film including a layer α and a layer β on a layer γ may be used. Examples of the lamination method can include a dry laminate method, a wet laminate method, and a sand laminate method. The lamination method is preferably a dry laminate method.

Ethylene-α-Olefin Copolymer (1)

Examples of the α-olefin having 3 to 20 carbon atoms constituting the monomer unit based on an α-olefin having 3 to 20 carbon atoms in the ethylene-α-olefin copolymer (1) can include propylene, 1-butene, 1-pentene, 1-hexene, 1-heptene, 1-octene, 1-nonene, 1-decene, 1-dodecene, 4-methyl-1-pentene, and 4-methyl-1-hexene. Among them, the α-olefin having 3 to 20 carbon atoms is preferably 1-hexene, 4-methyl-1-pentene, or 1-octene, and more preferably 1-hexene or 1-octene. The monomer units based on the α-olefin having 3 to 20 carbon atoms may be used alone or in combination of two or more thereof.

A content of the monomer unit based on ethylene is preferably 80% by mass or more and 97% by mass or less with respect to a total mass of 100% by mass of the ethylene-α-olefin copolymer (1). In addition, a content of the monomer unit based on the α-olefin having 3 to 20 carbon atoms is preferably 3% by mass or more and 20% by mass or less with respect to the total mass of 100% by mass of the ethylene-α-olefin copolymer (1).

The ethylene-α-olefin copolymer (1) may have another monomer unit based on a monomer other than ethylene and an α-olefin having 3 to 20 carbon atoms. Examples of the other monomer can include a conjugated diene such as butadiene or isoprene; a non-conjugated diene such as 1,4-pentadiene; acrylic acid; acrylic acid ester such as methyl acrylate or ethyl acrylate; methacrylate; methacrylic acid ester such as methyl methacrylate or ethyl methacrylate; and vinyl acetate.

The ethylene-α-olefin copolymer (1) is preferably a copolymer having a monomer unit based on ethylene and a monomer unit based on an α-olefin having 4 to 20 carbon atoms, more preferably a copolymer having a monomer unit based on ethylene and a monomer unit based on an α-olefin having 5 to 20 carbon atoms, and still more preferably a copolymer having a monomer unit based on ethylene and a monomer unit based on an α-olefin having 6 to 20 carbon atoms.

Examples of the ethylene-α-olefin copolymer (1) can include an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, an ethylene-1-hexene-1-octene copolymer, and an ethylene-1-butene-1-octene copolymer. Among them, the ethylene-α-olefin copolymer (1) is preferably an ethylene-1-hexene copolymer, an ethylene-1-octene copolymer, an ethylene-1-butene-1-hexene copolymer, or an ethylene-1-butene-1-octene copolymer, and more preferably an ethylene-1-hexene copolymer or an ethylene-1-butene-1-hexene copolymer.

The density of the ethylene-α-olefin copolymer (1) is preferably 915 kg/m$^3$ or more, and more preferably 920 kg/m$^3$ or more, from the viewpoint of improving slipperiness of the film. In addition, the density of the ethylene-α-olefin copolymer (1) is preferably 950 kg/m$^3$ or less, and more preferably 935 kg/m$^3$ or less, from the viewpoint of reducing appearance defects of the film such as fish eyes. The density of the ethylene-α-olefin copolymer (1) is 915 kg/m$^3$ or more and 950 kg/m$^3$ or less in one aspect, and 920 kg/m$^3$ or more and 935 kg/m$^3$ or less in another aspect. In a method of producing the ethylene-α-olefin copolymer (1) described below, the density of the ethylene-α-olefin copolymer (1) can be adjusted in a range of 915 kg/m$^3$ or more and 950 kg/m$^3$ or less by adjusting a concentration of the α-olefin during gas phase polymerization.

The melt flow rate (MFR) of the ethylene-α-olefin copolymer (1) is preferably 0.0001 g/10 min or more, and more preferably 0.001 g/10 min or more, from the viewpoint of reducing an extrusion load during the production of the film. In addition, the MFR of the ethylene-α-olefin copolymer (1) is preferably 0.2 g/10 min or less, and more preferably 0.01 g/10 min or less, from the viewpoint of improving slipperiness of the film. The MFR of the ethylene-α-olefin copolymer (1) is 0.0001 g/10 min or more and 0.2 g/10 min or less in one aspect, and 0.001 g/10 min or more and 0.01 g/10 min or less in another aspect. In the measurement of the MFR of the ethylene-α-olefin copolymer (1), a sample obtained by mixing about 1,000 ppm of an antioxidant with the ethylene-α-olefin copolymer (1) is generally used. In a method of producing the ethylene-α-olefin copolymer (1) described below, the MFR of the ethylene-α-olefin copolymer (1) can be adjusted in a range of 0.0001 g/10 min or more and 0.2 g/10 min or less by adjusting a concentration of a chain transfer agent during gas phase polymerization.

A weight average molecular weight (Mw) of the ethylene-α-olefin copolymer (1) is preferably 100,000 or more, more preferably 110,000 or more, and particularly preferably 120,000 or more, from the viewpoint of applying an excellent openability to the film. In addition, the Mw of the ethylene-α-olefin copolymer (1) is preferably 150,000 or less, more preferably 140,000 or less, and particularly preferably 130,000 or less, from the viewpoint of reducing appearance defects of the film such as fish eyes. The Mw of the ethylene-α-olefin copolymer (1) is 100,000 or more and 150,000 or less in one aspect, and 110,000 or more and 140,000 or less in another aspect.

A ratio of the weight average molecular weight of the ethylene-α-olefin copolymer (1) to the number average molecular weight of the ethylene-α-olefin copolymer (1) (Mw/Mn) is preferably 7.0 or more, and more preferably 7.5 or more, from the viewpoint of improving slipperiness of the film. In addition, the Mw/Mn of the ethylene-α-olefin copolymer (1) is preferably 9.0 or less, and more preferably 8.5 or less, from the viewpoint of reducing an extrusion load during the production of the film. The Mw/Mn of the ethylene-α-olefin copolymer (1) is 7.0 or more and 9.0 or less in one aspect, and 7.5 or more and 8.5 or less in another aspect.

A limiting viscosity (hereinafter, also referred to as [η], a unit is dl/g) of the ethylene-α-olefin copolymer (1) is preferably 1.0 dl/g or more, more preferably 1.2 dl/g or more, and still more preferably 1.3 dl/g or more, from the viewpoint of improving slipperiness of the film. In addition, [η] of the ethylene-α-olefin copolymer (1) is preferably 2.0 dl/g or less, more preferably 1.9 dl/g or less, and still more preferably 1.7 dl/g or less, from the viewpoint of reducing appearance defects of the film such as fish eyes. [η] of the ethylene-α-olefin copolymer (1) is 1.0 dl/g or more and 2.0 dl/g or less in one aspect, 1.2 dl/g or more and 1.9 dl/g or less in another aspect, and 1.3 dl/g or more and 1.7 dl/g or less in still another aspect. [η] of the ethylene-α-olefin copolymer (1) can be measured using an Ubbelohde viscometer at a temperature of 135° C. by using tetralin as a solvent.

The ethylene-α-olefin copolymer (1) can be produced, for example, by copolymerizing ethylene and an α-olefin in the presence of an olefin polymerization catalyst obtained by bringing a co-catalyst carrier (hereinafter, also referred to as a component (H)) obtained by supporting an activation co-catalyst component (hereinafter, also referred to as a component (I)) on a fine particulate carrier, a metallocene-based complex, and an electron-donating compound into contact with each other.

An example of the component (I) can include a zinc compound. An example of the zinc compound can include a compound obtained by bringing diethyl zinc (hereinafter, also referred to as a component (a)), fluorinated phenol (hereinafter, also referred to as a component (b)), and water (hereinafter, also referred to as a component (c)) into contact with each other.

Examples of the component (b) can include 3,4,5-trifluorophenol, 3,4,5-tris(trifluoromethyl)phenol, 3,4,5-tris(pentafluorophenyl)phenol, 3,5-difluoro-4-pentafluorophenylphenol, and 4,5,6,7,8-pentafluoro-2-naphthol. Among them, the component (b) is preferably 3,4,5-trifluorophenol.

The fine particulate carrier is formed of a porous substance having a 50% volume average particle diameter of 10 to 500 μm. The 50% volume average particle diameter is measured by, for example, a light scattering laser diffraction method. Examples of the fine particulate carrier can include an inorganic substance and an organic polymer. Examples of the inorganic substance can include an inorganic oxide such as $SiO_2$, $Al_2O_3$, MgO, $ZrO_2$, $TiO_2$, $B_2O_3$, CaO, ZnO, BaO, or $ThO_2$; and a clay and clay mineral such as smectite, montmorillonite, hectorite, laponite, or saponite. Examples of the organic polymer can include polyethylene, polypropylene, and a styrene-divinylbenzene copolymer. The fine particulate carrier is preferably a fine particulate carrier formed of an inorganic substance (hereinafter, referred to as an inorganic fine particulate carrier).

A pore volume of the fine particulate carrier is generally 0.3 to 10 mL/g. A specific area of the fine particulate carrier is generally 10 to 1,000 m²/g. The pore volume and the specific area are measured by a gas adsorption method. The pore volume is determined by analyzing a gas desorption amount by a BJH method, and the specific area is determined by analyzing a gas adsorption amount by a BET method.

The component (H) is a carrier obtained by supporting the component (I) on a fine particulate carrier. The component (H) can be obtained by bringing diethyl zinc (component (a)) which is the component (I), fluorinated phenol (component (b)), water (component (c)), an inorganic fine particulate carrier (hereinafter, also referred to as a component (d)), and trimethyldisilazane ($(((CH_3)_3Si)_2NH)$) (hereinafter, also referred to as a component (e)) into contact with each other.

The component (d) is preferably silica gel.

In a method of producing the component (I), when a molar ratio of the use amounts of the components is 1:y:z (component (a):component (b):component (c)), each of the component (a), the component (b), and the component (c) can be used so that y and z satisfy the following expressions:

$$|2-y-2z| \leq 1 \tag{3}$$

$$z \geq -2.5y + 2.48 \tag{4, and}$$

$$y < 1 \tag{5}$$

In Expressions [3] to [5], each of y and z represents a number greater than 0.

A molar ratio y of the use amount of the component (b) to the use amount of the component (a) and a molar ratio z of the use amount of the component (c) to the use amount of the component (a) are not particularly limited as long as Expressions [3], [4], and [5] are satisfied. y is generally 0.55 to 0.99, preferably 0.55 to 0.95, more preferably 0.6 to 0.9, and still more preferably 0.7 to 0.8. In order to obtain the ethylene-α-olefin copolymer (1), y is preferably 0.55 or more. When y is 1 or more, appearance defects such as fish eyes may occur in the obtained film containing the ethylene-α-olefin copolymer.

The use amounts of the component (a) and the component (b) are adjusted so that the number of moles of a zinc atom derived from the component (a) contained in 1 g of particles obtained by bringing the component (a) and the component (b) into contact with each other is preferably 0.1 mmol or more, and more preferably 0.5 to 20 mmol. The use amount of the component (e) to the use amount of the component (d) is preferably 0.1 mmol or more, and more preferably 0.5 to 20 mmol, with respect to 1 g of the component (d).

The metallocene-based complex is a transition metal compound having a ligand having a cyclopentadiene-type anion skeleton. As the metallocene-based complex, a transition metal compound represented by the following General Formula [6] or a μ-oxo type transition metal compound dimer thereof is preferred.

$$L^2_a M^2 X^1_b \tag{6}$$

wherein $M^2$ is a transition metal atom of groups 3 to 11 or the lanthanide series of the periodic table, $L^2$ is a group having a cyclopentadiene-type anion skeleton, a plurality of $L^2$s may be directly linked to each other, or may be linked to each other through a residue containing a carbon atom, a silicon atom, a nitrogen atom, an oxygen atom, a sulfur atom, or a phosphorus atom, X' is a halogen atom, a hydrocarbon group (excluding a group having a cyclopentadiene-type anion skeleton), or a hydrocarbon oxy group, a represents 2, and b represents 2.

In General Formula [6], $M^2$ is a transition metal atom of groups 3 to 11 or the lanthanide series of the periodic table (IUPAC, 1989), and examples thereof can include a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom, and an ytterbium atom.

In General Formula [6], $M^2$ is preferably a titanium atom, a zirconium atom, a hafnium atom, a vanadium atom, a chromium atom, an iron atom, a cobalt atom, or a nickel atom, more preferably a titanium atom, a zirconium atom, or a hafnium atom, and still more preferably a zirconium atom.

In General Formula [6], $L^2$ is an $\eta^5$-(substituted) indenyl group, and two $L^2$s may be the same as or different from each other. The two Les may be linked to each other through a cross-linking group containing a carbon atom, a silicon atom, a nitrogen atom, an oxygen atom, a sulfur atom, or a phosphorus atom. The $\eta^5$-(substituted) indenyl group represents an $\eta^5$-indenyl group which may have a substituent.

The $\eta^5$-(substituted) indenyl group in $L^2$ is an $\eta^5$-(substituted) indenyl group having at least hydrogen atoms at the 5-position and the 6-position, and specific examples thereof can include an $\eta^5$-indenyl group, an $\eta^5$-2-methylindenyl group, an $\eta^5$-3-methylindenyl group, an $\eta^5$-4-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4-phenylindenyl group, an $\eta^5$-2-methyl-4-phenylindenyl group, an $\eta^5$-2-methyl-4-naphthylindenyl group, and substituents thereof. Herein, regarding the name of the transition metal compound, "$\eta^5$-" may be omitted. $L^2$ is preferably an indenyl group.

Two (substituted) indenyl groups may be linked to each other through a cross-linking group containing a carbon atom, a silicon atom, a nitrogen atom, an oxygen atom, a sulfur atom, or a phosphorus atom. Examples of the cross-linking group can include an alkylene group such as an ethylene group or a propylene group; a substituted alkylene group such as a dimethylmethylene group or a diphenylmethylene group; a silylene group; a substituted silylene group such as a dimethylsilylene group, a diphenylsilylene group, or a tetramethyldisilylene group; and a hetero atom such as a nitrogen atom, an oxygen atom, a sulfur atom, or a phosphorus atom. The cross-linking group is preferably an ethylene group, a dimethylmethylene group, or a dimethylsilylene group, and more preferably an ethylene group.

Examples of $X^1$ in General Formula [6] can include a halogen atom, a hydrocarbon group (excluding a group having a cyclopentadiene-type anion skeleton), and a hydrocarbon oxy group. Examples of the halogen atom can include a fluorine atom, a chlorine atom, a bromine atom, and an iodine atom.

Examples of the hydrocarbon group can include an alkyl group, an aralkyl group, an aryl group, and an alkenyl group. Examples of the hydrocarbon oxy group can include an alkoxy group, an aralkyloxy group, and an aryloxy group.

Examples of the alkyl group can include a methyl group, an ethyl group, an n-propyl group, an isopropyl group, an n-butyl group, a sec-butyl group, a tert-butyl group, an isobutyl group, an n-pentyl group, a neopentyl group, an amyl group, an n-hexyl group, an n-octyl group, an n-decyl group, an n-dodecyl group, an n-pentadecyl group, and an n-eicosyl group. The alkyl group may be substituted with a halogen atom such as a fluorine atom, a chlorine atom, a bromine atom, or an iodine atom.

Examples of the alkyl group substituted with the halogen atom can include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, and a perbromopropyl group. Some hydrogen atoms in these alkyl groups may be substituted with an alkoxy group such as a methoxy group or an ethoxy group; an aryloxy group such as a phenoxy group; and an aralkyloxy group such as a benzyloxy group.

Examples of the aralkyl group can include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, an (n-propylphenyl)methyl group, an (isopropylphenyl)methyl group, an (n-butylphenyl)methyl group, a (sec-butylphenyl)methyl group, a (tert-butylphenyl)methyl group, an (n-pentylphenyl)methyl group, a (neopentylphenyl)methyl group, an (n-hexylphenyl)methyl group, an (n-octylphenyl)methyl group, an (n-decylphenyl)methyl group, an (n-dodecylphenyl)methyl group, a naphthylmethyl group, and an anthracenylmethyl group. The aralkyl group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the aryl group can include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, an n-propylphenyl group, an isopropylphenyl group, an n-butylphenyl group, a sec-butylphenyl group, a tert-butylphenyl group, an n-pentylphenyl group, a neopentylphenyl group, an n-hexylphenyl group, an n-octylphenyl group, an n-decylphenyl group, an n-dodecylphenyl group, an n-tetradecylphenyl group, a naphthyl group, and an anthracenyl group. The aryl group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the alkenyl group can include an allyl group, a methallyl group, a crotyl group, and a 1,3-diphenyl-2-propenyl group.

Examples of the alkoxy group can include a methoxy group, an ethoxy group, an n-propoxy group, an isopropoxy group, an n-butoxy group, a sec-butoxy group, a tert-butoxy group, an n-pentoxy group, a neopentoxy group, an n-hexoxy group, an n-octoxy group, an n-dodesoxy group, an n-pentadesoxy group, and an n-icosoxy group. The alkoxy group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the aralkyloxy group can include a benzyloxy group, a (2-methylphenyl)methoxy group, a (3-methylphenyl) methoxy group, a (4-methylphenyl)methoxy group, a (2,3-dimethylphenyl)methoxy group, a (2,4-dimethylphenyl)methoxy group, a (2,5-dimethylphenyl) methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6- trimethylphenyl)methoxy group, a (2,4,5-trimethylphenyl) methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl) methoxy group, a (2,3,5,6-tetramethylphenyl) methoxy group, a (pentamethylphenyl)methoxy group, an (ethylphenyl)methoxy group, an (n-propylphenyl)methoxy group, an (isopropylphenyl)methoxy group, an (n-butylphenyl) methoxy group, a (sec-butylphenyl)methoxy group, a (tert-butylphenyl)methoxy group, an (n-hexylphenyl)methoxy group, an (n-octylphenyl)methoxy group, an (n-decylphenyl)methoxy group, a naphthylmethoxy group, and an anthracenylmethoxy group. The aralkyloxy group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group.

Examples of the aryloxy group can include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, an n-propylphenoxy group, an isopropylphenoxy group, an n-butylphenoxy group, a sec-butylphenoxy group, a tert-butylphenoxy group, an n-hexylphenoxy group, an n-octylphenoxy group, an n-decylphenoxy group, an n-tetradecylphenoxy group, a naphthoxy group, and an anthracenoxy group. The aryloxy group may have a substituent such as a halogen atom such as a fluorine atom, a chlorine atom, a bromine atom, or an iodine atom; an alkoxy group such as a methoxy group or an ethoxy group; an aryloxy group such as a phenoxy group; or an aralkyloxy group such as a benzyloxy group. X' is preferably a chlorine atom, a methoxy group, or a phenoxy group, more preferably a chlorine atom or a phenoxy group, and still more preferably a phenoxy group.

Specific examples of the metallocene-based complex can include dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, and dimethylsilylenebis (2-methyl-4-naphthylindenyl)titanium dichloride, compounds in which titanium in these compounds is changed to zirconium or hafnium, compounds in which dimethylsilylene in these compounds is changed to methylene, ethylene, dimethylmethylene (isopropylidene), diphenylmethylene, diethylsilylene, diphenylsilylene, or dimethoxysilylene, and compounds in which dichloride in these compounds is changed to difluoride, dibromide, diiodide, dimethyl, diethyl, diisopropyl, diphenyl, dibenzyl, dimethoxide, diethoxide, di(n-propoxide), di(isopropoxide), diphenoxide, or di(pentafluorophenoxide).

The metallocene-based complex is preferably ethylenebis (indenyl)zirconium dichloride, dimethylsilylenebis(indenyl) zirconium dichloride, dimethylmethylenebis(indenyl)zirconium dichloride, ethylenebis(indenyl)zirconium diphenoxide, dimethylsilylenebis(indenyl)zirconium diphenoxide, or dimethylmethylenebis(indenyl)zirconium diphenoxide, and more preferably ethylenebis(indenyl)zirconium diphenoxide.

The use amount of the metallocene-based complex is preferably $5 \times 10^{-6}$ to $5 \times 10^{-4}$ mol with respect to 1 g of the component (H).

Examples of the electron donating compound can include triethylamine, triisobutylamine, and tri-n-octylamine. Among them, triethylamine is preferred as the electron donating compound.

The olefin polymerization catalyst is preferably an olefin polymerization catalyst obtained by bringing the component (H), the metallocene-based complex, the organoaluminum compound, and the electron-donating compound into contact with each other.

Examples of the organoaluminum compound can include trimethylaluminum, triethylaluminum, tributylaluminum, triisobutylaluminum, and tri-n-octyl aluminum. As the organoaluminum compound, triisobutylaluminum or tri-n-octyl aluminum is preferred, and triisobutylaluminum is more preferred.

The use amount of the organoaluminum compound is preferably 1 to 2,000, which is represented by a ratio of the number of moles of the aluminum atom of the organoaluminum compound to the number of moles of the metal atom of the metallocene-based complex (Al/M).

The use amount of the electron donating compound is preferably 1 to 50 mol %, and more preferably 3 to 20 mol %, with respect to the number of moles of the aluminum atom of the organoaluminum compound.

The olefin polymerization catalyst obtained by bringing the component (H), the metallocene-based complex, the organoaluminum compound, and the electron-donating compound into contact with each other may be a polymerization catalyst obtained by contacting oxygen, if necessary.

The use amount of the oxygen is preferably 1 to 100 mol %, more preferably 5 to 80 mol %, and still more preferably 10 to 40 mol %, with respect to the number of moles of the aluminum atom of the organoaluminum compound.

The olefin polymerization catalyst preferably contains a pre-polymerization catalyst component obtained by polymerizing small amounts of ethylene and an α-olefin having 3 to 20 carbon atoms (hereinafter, also referred to as pre-polymerization) in the presence of a catalyst component obtained by bringing the component (H), the metallocene-based complex, the organoaluminum compound, and the electron-donating compound into contact with each other.

An example of a method of producing the pre-polymerization catalyst component can include a method including the following steps (i) to (iv):

step (i): a step of heat-treating a saturated aliphatic hydrocarbon compound solution containing a metallocene-based complex at 40° C. or higher to obtain a heat-treated material;

step (ii): a step of bringing the heat-treated material obtained in the step (i) and a component (H) into contact with each other to obtain a contact-treated material;

step (iii): a step of bringing the contact-treated material obtained in the step (ii) and an organoaluminum compound into contact with each other to obtain a catalyst component; and step (iv): a step of pre-polymerizing ethylene and an α-olefin having 3 to 20 carbon atoms in the presence of the catalyst component obtained in the step (iii) to obtain a pre-polymerization catalyst component.

In the step (i), the saturated aliphatic hydrocarbon compound solution containing the metallocene-based complex is prepared by, for example, a method of adding a metallocene-based complex to a saturated aliphatic hydrocarbon compound solvent. In general, the metallocene-based complex is added as powder or slurry of a saturated aliphatic hydrocarbon compound solution.

Examples of a saturated aliphatic hydrocarbon compound used in the preparation of the saturated aliphatic hydrocarbon compound solution containing the metallocene-based complex can include propane, n-butane, isobutane, n-pentane, isopentane, n-hexane, cyclohexane, and heptane. For the saturated aliphatic hydrocarbon compound solution, the saturated aliphatic hydrocarbon compounds may be used alone or in combination of two or more thereof. A boiling point of the saturated aliphatic hydrocarbon compound at a normal pressure is preferably 100° C. or lower, and more preferably 90° C. or lower. As the saturated aliphatic hydrocarbon compound, propane, n-butane, isobutane, n-pentane, isopentane, n-hexane, or cyclohexane is further preferred.

In the heat treatment of the saturated aliphatic hydrocarbon compound solution containing the metallocene-based complex, the temperature of the saturated aliphatic hydrocarbon compound solvent containing the metallocene-based complex is preferably adjusted to a temperature of 40° C. or higher. During the heat treatment, the solvent may be allowed to stand or stirred. The temperature is preferably 45° C. or higher, and more preferably 50° C. or higher, from the viewpoint of improving moldability of the film. In addition, the temperature is preferably 100° C. or lower, and more preferably 80° C. or lower, from the viewpoint of improving catalyst activity. A time for the heat treatment is generally 0.5 to 12 hours. The time is preferably 1 hour or longer, and more preferably 2 hours or longer, from the viewpoint of improving moldability of the film. In addition, the time is preferably 6 hours or shorter, and more preferably 4 hours or shorter, from the viewpoint of stability of catalyst performance.

In the step (ii), it is preferable that the heat-treated material and the component (H) are brought into contact with each other. Examples of a contacting method can include a method of adding the component (H) to the heat-treated material, and a method of adding the heat-treated material and the component (H) to the saturated aliphatic hydrocarbon compound. In general, the component (H) is added as powder or slurry of a saturated aliphatic hydrocarbon compound solvent.

The temperature of the contact treatment in the step (ii) is preferably 70° C. or lower, and more preferably 60° C. or lower. In addition, the temperature is preferably 10° C. or higher, and more preferably 20° C. or higher. In general, the time for the contact treatment is 0.1 hours or longer and 2 hours or shorter.

In the step (iii), it is preferable that the contact-treated material obtained in the step (ii) and the organoaluminum compound are brought into contact with each other. Examples of a contacting method can include a method of adding the organoaluminum compound to the contact-treated material obtained in the step (ii), and a method of adding the contact-treated material obtained in the step (ii) and the organoaluminum compound to the saturated aliphatic hydrocarbon compound.

The temperature of the contact treatment in the step (iii) is preferably 70° C. or lower, and more preferably 60° C. or lower. In addition, the temperature is preferably 10° C. or higher, and more preferably 20° C. or higher, from the viewpoint of efficiently expressing activation of pre-polymerization. In general, the time for the contact treatment is 0.01 hours to 0.5 hours.

The contact treatment in the step (iii) is preferably performed in the presence of ethylene and an α-olefin. In general, an olefin which is a raw material in the pre-polymerization may be used as the α-olefin. The amount of each of ethylene and α-olefin is preferably 0.05 g or more and 1 g or less per 1 g of the component (H).

The steps (i) to (iii) may be performed by separately adding the saturated aliphatic hydrocarbon compound, the component (H), the metallocene-based complex, and the organoaluminum compound to a pre-polymerization reactor. All of the steps (i) to (iii) may be performed in the pre-polymerization reactor, the steps (ii) and (iii) may be performed in the pre-polymerization reactor, or the step (iii) may be performed in the pre-polymerization reactor.

The step (iv) is a step of pre-polymerizing ethylene and an α-olefin having 3 to 20 carbon atoms (polymerizing small amounts of ethylene and an α-olefin having 3 to 20 carbon atoms) in the presence of the catalyst component obtained in the step (iii) to obtain a pre-polymerization catalyst component. In general, the pre-polymerization may be performed by a slurry polymerization method. The pre-polymerization may be performed by any one of batch type, semi-batch type, and continuous polymerization methods. Furthermore, the pre-polymerization may be performed by adding a chain transfer agent such as hydrogen.

In a case where the pre-polymerization is performed by a slurry polymerization method, in general, a saturated aliphatic hydrocarbon compound is used as a solvent. Examples of the saturated aliphatic hydrocarbon compound can include propane, n-butane, isobutane, n-pentane, isopentane, n-hexane, cyclohexane, and heptane. For the saturated aliphatic hydrocarbon compound solution, the saturated aliphatic hydrocarbon compounds may be used alone or in combination of two or more thereof. A boiling point of the saturated aliphatic hydrocarbon compound at a normal pressure is preferably 100° C. or lower, and more preferably 90° C. or lower. As the saturated aliphatic hydrocarbon compound, propane, n-butane, isobutane, n-pentane, isopentane, n-hexane, or cyclohexane is further preferred.

In the case where the pre-polymerization is performed by a slurry polymerization method, as a slurry concentration, the amount of component (H) per liter of a solvent is generally 0.1 to 600 g, and preferably 0.5 to 300 g. A pre-polymerization temperature is generally −20 to 100° C., and preferably 0 to 80° C. The pre-polymerization temperature may be appropriately changed during the pre-polymerization, but an initial temperature of the pre-polymerization is preferably 45° C. or lower, and more preferably 40° C. or lower. In addition, a partial pressure of olefins in a gas phase during the pre-polymerization is generally 0.001 to 2 MPa, and more preferably 0.01 to 1 MPa. The time for the pre-polymerization is generally 2 minutes to 15 hours.

Examples of the α-olefin having 3 to 20 carbon atoms used in the pre-polymerization can include propylene, 1-butene, 1-pentene, 1-hexene, 1-heptene, 1-octene, 1-nonene, 1-decene, 1-dodecene, 4-methyl-1-pentene, and 4-methyl-1-hexene. The α-olefin having 3 to 20 carbon atoms is preferably 1-hexene, 4-methyl-1-pentene, or 1-octene, and more preferably 1-hexene or 1-octene. The α-olefins having 3 to 20 carbon atoms may be used alone or in combination of two or more thereof.

A content of the polymer pre-polymerized in the pre-polymerization catalyst component is generally 0.01 to 1,000 g, preferably 0.05 to 500 g, and more preferably 0.1 to 200 g, per 1 g of the component (H).

In the production of the ethylene-α-olefin copolymer (1), a slurry polymerization method or a gas phase polymerization method is preferably used, and a continuous gas phase polymerization method is more preferably used. Examples of a catalyst used in the slurry polymerization method can include inert hydrocarbon solvents such as propane, butane, isobutane, pentane, hexane, heptane, and octane. As a gas phase polymerization reaction apparatus used in the continuous gas phase polymerization method, an apparatus having a fluidized bed type reaction tank is generally used, and an apparatus having a fluidized bed type reaction tank having an enlarged portion is preferably used. Stirring blades may be installed in the reaction tank.

In a case where the olefin polymerization catalyst is an olefin polymerization catalyst containing a pre-polymerization catalyst component, as a method of supplying the pre-polymerization catalyst component to a continuous polymerization reaction tank in which formation of particles of the ethylene-α-olefin copolymer (1) is performed, a method of supplying the pre-polymerization catalyst component in a moisture-free state by using inert gas such as argon, nitrogen, hydrogen, or ethylene, or a method of dissolving or diluting each component in a solvent and supplying the pre-polymerization catalyst component in a solution or slurry state is generally used.

A polymerization temperature in a case where the ethylene-α-olefin copolymer (1) is produced by a gas phase polymerization method is generally lower than a temperature at which the ethylene-α-olefin copolymer (1) melts, preferably 0° C. to 150° C., more preferably 30° C. to 100° C., and still more preferably 70° C. to 87° C. In order to adjust melt fluidity of the ethylene-α-olefin copolymer (1), hydrogen may be added. The amount of hydrogen with respect to 100 mol % of ethylene is preferably controlled to 0.01 to 1.1 mol %. The ratio of the hydrogen to the ethylene during the gas phase polymerization can be controlled by the amount of hydrogen generated during the polymerization and the amount of hydrogen to be added during the polymerization. Inert gas may coexist in mixed gas in the polymerization reaction tank. In a case where the olefin polymerization catalyst is an olefin polymerization catalyst containing a pre-polymerization catalyst component, the olefin polymerization catalyst may contain a co-catalyst component such as an organoaluminum compound.

Ethylene-α-Olefin Copolymer (2)

Examples of the α-olefin having 3 to 20 carbon atoms constituting the monomer unit based on an α-olefin having 3 to 20 carbon atoms in the ethylene-α-olefin copolymer (2) can include propylene, 1-butene, 1-pentene, 1-hexene, 1-heptene, 1-octene, 1-nonene, 1-decene, 1-dodecene, 4-methyl-1-pentene, and 4-methyl-1-hexene. Among them, the α-olefin having 3 to 20 carbon atoms is preferably 1-hexene, 4-methyl-1-pentene, or 1-octene, and more preferably 1-hexene or 1-octene. The monomer units based on the α-olefin having 3 to 20 carbon atoms may be used alone or in combination of two or more thereof.

A content of the monomer unit based on ethylene is preferably 50% by mass or more and 99.5% by mass or less with respect to a total mass of 100% by mass of the ethylene-α-olefin copolymer (2). In addition, a content of the monomer unit based on the α-olefin having 3 to 20 carbon atoms is preferably 0.5% by mass or more and 50% by mass or less with respect to the total mass of 100% by mass of the ethylene-α-olefin copolymer (2).

The ethylene-α-olefin copolymer (2) may have another monomer unit based on a monomer other than ethylene and an α-olefin having 3 to 20 carbon atoms. Examples of the other monomer can include a conjugated diene such as butadiene or isoprene; a non-conjugated diene such as 1,4-pentadiene; acrylic acid; acrylic acid ester such as methyl acrylate or ethyl acrylate; methacrylate; methacrylic acid ester such as methyl methacrylate or ethyl methacrylate; and vinyl acetate.

The ethylene-α-olefin copolymer (2) is preferably a copolymer having a monomer unit based on ethylene and a monomer unit based on an α-olefin having 4 to 20 carbon atoms, more preferably a copolymer having a monomer unit based on ethylene and a monomer unit based on an α-olefin having 5 to 20 carbon atoms, and still more preferably a copolymer having a monomer unit based on ethylene and a monomer unit based on an α-olefin having 6 to 20 carbon atoms.

Examples of the ethylene-α-olefin copolymer (2) can include an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, and an ethylene-1-butene-1-octene copolymer. As the ethylene-α-olefin copolymer (2), an ethylene-1-hexene copolymer, an ethylene-4-methyl-1-pentene copolymer, or an ethylene-1-octene copolymer is preferred, and an ethylene-1-hexene copolymer is more preferred.

The density of the ethylene-α-olefin copolymer (2) is preferably 850 kg/m$^3$ or more, and more preferably 880 kg/m$^3$ or more, from the viewpoint of improving slipperiness of the film. In addition, the density of the ethylene-α-olefin copolymer (2) is preferably less than 890 kg/m$^3$, from the viewpoint of improving strength of the film. The density of the ethylene-α-olefin copolymer (2) is 850 kg/m$^3$ or more and less than 890 kg/m$^3$ in one aspect, and 880 kg/m$^3$ or more and less than 890 kg/m$^3$ in another aspect. In a method of producing the ethylene-α-olefin copolymer (2) described below, the density of the ethylene-α-olefin copolymer (2) can be adjusted in a range of 880 kg/m$^3$ or more and less than 890 kg/m$^3$ by adjusting a concentration of the α-olefin during gas phase polymerization.

The melt flow rate (MFR) of the ethylene-α-olefin copolymer (2) is preferably 0.1 g/10 min or more, and more preferably 1 g/10 min or more, from the viewpoint of improving moldability of the film, and in particular, from the viewpoint of reducing an extrusion load during the production of the film. In addition, the MFR of the ethylene-α-olefin copolymer (2) is preferably 10 g/10 min or less, and more preferably 5 g/10 min or less, from the viewpoint of improving strength of the film. The MFR of the ethylene-α-olefin copolymer (2) is 0.1 g/10 min or more and 10 g/10 min or less in one aspect, and 1 g/10 min or more and 5 g/10 min or less in another aspect. In the measurement of the MFR of the ethylene-α-olefin copolymer (2), a sample obtained by mixing about 1,000 ppm of an antioxidant with the ethylene-α-olefin copolymer (2) is generally used. In a method of producing the ethylene-α-olefin copolymer (2) described below, the MFR of the ethylene-α-olefin copolymer (2) can be adjusted in a range of 0.1 g/10 min or more and 10 g/10 min or less by adjusting a concentration of a chain transfer agent during gas phase polymerization.

A weight average molecular weight (Mw) of the ethylene-α-olefin copolymer (2) is preferably 60,000 or more, and more preferably 70,000 or more, from the viewpoint of improving mechanical strength of the film. In addition, the Mw of the ethylene-α-olefin copolymer (2) is preferably 100,000 or less, and more preferably 90,000 or less, from the viewpoint of extrusion molding suitability. The Mw of the ethylene-α-olefin copolymer (2) is 60,000 or more and 100,000 or less in one aspect, and 70,000 or more and 90,000 or less in another aspect.

The ethylene-α-olefin copolymer (2) can be produced by copolymerizing ethylene and an α-olefin having 3 to 20 carbon atoms in the presence of a metallocene-based polymerization catalyst or a Ziegler-Natta polymerization catalyst.

Examples of the metallocene-based polymerization catalyst can include the following (C1) to (C4) catalysts:

(C1) a catalyst composed of a component containing a transition metal compound having a group having a cyclopentadiene-type skeleton and a component containing an alumoxane compound;

(C2) a catalyst composed of a component containing the transition metal compound and a component containing an ionic compound such as trityl borate or anilinium borate;

(C3) a catalyst composed of a component containing the transition metal compound, a component containing the ionic compound, and a component containing an organoaluminum compound; and (C4) a catalyst obtained by supporting or impregnating each component described in any one of (C1) to (C3) on an inorganic particulate carrier such as $SiO_2$ or $Al_2O_3$ or a particulate polymer carrier such as an olefin polymer of ethylene, styrene, or the like.

As the Ziegler-Natta polymerization catalyst, a so-called Mg—Ti-based Ziegler catalyst obtained by combining a solid catalyst component in which a titanium compound is supported on a magnesium compound with organoaluminum (see, for example, "Catalyst utilization dictionary; published by Kogyo Chosakai Publishing Co., Ltd., in 2004", "Application system diagram-transition of olefin polymerization catalyst-; published by Japan Institute of Invention and Innovation in 1995", and the like) is preferably used.

The catalyst used for the production of the ethylene-α-olefin copolymer (2) is preferably a metallocene-based polymerization catalyst, from the viewpoint of improving strength of the film.

Examples of a polymerization method used in the production of the ethylene-α-olefin copolymer (2) can include a bulk polymerization method, a solution polymerization method, a slurry polymerization method, a gas phase polymerization method, and a high-pressure ionic polymerization method. Here, the bulk polymerization method refers to a method of performing polymerization by using a liquid olefin as a medium at a polymerization temperature. Each of the solution polymerization method and the slurry polymerization method refers to a method of performing polymerization in an inert hydrocarbon solvent such as propane, butane, isobutane, pentane, hexane, heptane, or octane. In addition, the gas phase polymerization method refers to a method in which a gaseous monomer is used as a medium and a gaseous monomer is polymerized in the medium. These polymerization methods may be either a batch type or a continuous type, and may be either a single-stage type performed in a single polymerization tank or a multi-stage type performed in a polymerization apparatus in which a plurality of polymerization reaction tanks are connected in series. Various conditions (polymerization temperature, polymerization pressure, monomer concentration, addition amount of catalyst, polymerization time, and the like) in the polymerization step may be appropriately determined.

Method of Producing Film

A method of producing the film according to the present embodiment includes: melt-kneading and extruding the mixture of the ethylene-α-olefin copolymer (1) and the ethylene-α-olefin copolymer (2) using an extruder equipped with a screw; and forming a film of the extruded mixture.

The extruder will be described in detail using FIG. 1. An extruder 1 includes a heating cylinder 2 and a screw 3 configured to be rotatable in the heating cylinder 2.

The screw 3 includes a feed section (not illustrated) sending the mixture of the ethylene-α-olefin copolymer (1) and the ethylene-α-olefin copolymer (2) supplied from a hopper to a downstream side, a compression section 4 which compresses and kneads the mixture sent from the feed section, and sends the obtained mixture to the downstream side, and a metering section (not illustrated) which further uniformly kneads the mixture sent from the compression section 4, and sends the obtained mixture to a tip of the screw.

The compression section 4 includes a rotary main shaft 41 and a spiral blade 42 spirally formed on an outer circumference of the rotary main shaft 41. The spiral blade 42 having 14 pitches or more and 18 pitches or less is preferably formed in the compression section 4. Here, 1 pitch refers to a unit in which the spiral blade 42 encircles an outer circumferential surface of the rotary main shaft 41, and is indicated by P illustrated in FIG. 1. A length of 1 pitch is preferably 46 mm or more and 54 mm or less.

The rotary main shaft 41 has two spiral groove portions 43 (43a and 43b) constituting a spiral groove arranged between the pitches of the spiral blade 42. Each of the two spiral groove portions 43a and 43b has a first region A1 in which a groove depth gradually increases in a moving direction (direction indicated by the arrow X illustrated in FIG. 1) of the mixture and a second region A2 in which the groove depth gradually decreases in the moving direction of the mixture. The first regions A1 and the second regions A2 are not arranged adjacent to each other in the two spiral groove portions 43a and 43b. That is, the second region A2 is arranged in a portion of one spiral groove portion 43b adjacent to a portion in which the first region A1 of the other spiral groove portion 43a is arranged. In addition, the first region A1 is arranged in a portion of one spiral groove portion 43b adjacent to a portion in which the second region A2 of the other spiral groove portion 43a is arranged. With this configuration, the depths of the two spiral groove portions 43a and 43b arranged adjacent to each other can be changed.

Furthermore, each of the two spiral groove portions 43a and 43b has a third region A3 in which the groove depth is constant in the moving direction of the mixture. Specifically, in one spiral groove portion 43a, the first region A1, the third region A3, the first region A1, and the second region A2 are repeatedly and continuously arranged. In addition, in the other spiral groove portion 43b, the second region A2, the third region A3, the second region A2, and the first region A1 are repeatedly and continuously arranged. Each of the regions is arranged by 0.5 pitches.

Here, the groove depth refers to the shortest distance (h illustrated in FIG. 1) between an inner circumferential surface of the heating cylinder 2 and an outer circumferential surface of the spiral groove portion 43. The groove depth at the compression section 4 preferably has a minimum value of 0.8 mm or more and 1.5 mm or less, and preferably has a maximum value of 5.0 mm or more and 6.0 mm or less.

The groove depth at each of the feed section and the metering section is preferably constant. A ratio of the groove depth at the feed section to the groove depth at the metering section (groove depth ratio) is preferably 1.3 or more and 2.0 or less.

A diameter (D, unit: mm) of the heating cylinder 2 is preferably 46 mm or more and 54 mm or less. A length of the screw to the diameter of the heating cylinder 2 (L/D) is preferably 27 or more and 30 or less. The length (L, unit: mm) of the screw refers to a length from an upstream end of the spiral blade 42 to a tip of the spiral blade 42.

In the method of producing the film according to the present embodiment, the two spiral groove portions 43a and 43b are arranged between the pitches of the spiral blade 42, but the present invention is not limited to the configuration, and one or three or more spiral groove portions 43 may be arranged.

In addition, in the method of producing the film according to the present embodiment, the spiral groove portion 43 has the third region A3 in which the groove depth is constant in the moving direction of the mixture, but the present invention is not limited to the configuration, and the spiral groove portion 43 may not have the third region A3. That is, in the spiral groove portion 43, the first region A1 and the second region A2 may be repeatedly and continuously arranged.

Furthermore, in the method of producing the film according to the present embodiment, each of the regions is arranged in the spiral groove portions 43a and 43b by 0.5 pitches, but the present invention is not limited to the configuration, and a distance between the regions can be appropriately changed depending on a material of the mixture to be compressed and kneaded.

The screw 3 may further include a barrier portion (not illustrated) for improving a mixing effect of the mixture sent from the metering section.

Bag

According to the present invention, a bag is obtained by heat-sealing the film described above. Examples of a heat-sealing method can include a hot plate sealing method, an impulse sealing method, a belt sealing method, and a fusing sealing method.

The bag according to the present embodiment is used for packing various contents. Examples of the content can include foods, beverages, seasonings, dairy products such as milk, medicines, electronic components such as semiconductor products, pet foods, pet care products, detergents, and toiletries.

The film, the method of producing the film, and the bag obtained by heat-sealing the film according to the present embodiment are not limited to the above embodiments, but various modifications can be made without departing from the gist of the present invention. In addition, configurations, methods, or the like of embodiments other than the above embodiments may be optionally employed and combined, and configurations, methods, or the like according to one embodiment may be applied to configurations, methods, or the like according to another embodiment.

EXAMPLES

Hereinafter, the present invention will be described in more detail with reference to Examples and Comparative Examples. However, the present invention is not limited to the following examples.

Measurement Method

A value of each item in Examples and Comparative Examples was measured according to the following method.

Element Analysis

Zn: A sample was added to an aqueous sulfuric acid solution (concentration: 1 M) and irradiated with ultrasonic waves to extract a metal component. The resulting solution was quantified by an ICP emission analysis method.

F: A sample was burned in a flask filled with oxygen, the generated combustion gas was absorbed into an aqueous sodium hydroxide solution (10%), and the resulting aqueous solution was quantified by an ion electrode method.

Melt Flow Rate (MFR, Unit: g/10 Min)

A melt flow rate was measured under conditions of a temperature of 190° C. and a load of 21.18 N by the method A specified in JIS K7210-1995.

Density (Unit: Kg/m$^3$)

A density was measured by the method A specified in JIS K7112-1980 after performing annealing described in JIS K6760-1995.

Mw

A polystyrene-reduced weight average molecular weight (Mw) was determined by gel permeation chromatography (GPC) measurement.

GPC apparatus: HLC-8121GPC/HT (manufactured by Tosoh Corporation)

GPC column: three TSKgelGMH$_6$-HTs (manufactured by Tosoh Corporation)

Measurement temperature: 140° C.

Solvent and mobile phase: ortho-dichlorobenzene containing 0.05% by mass of dibutyl hydroxytoluene (Wako Pure Chemical Industries, special grade)

Mobile phase flow rate: 1.0 mL/min

Injection amount: 300 µL

Detector: differential refractometer

Molecular weight standard material: standard polystyrene

Data reading interval: 2.5 seconds

Limiting Viscosity ([η], unit: dl/g)

A polymer was dissolved in a tetralin solvent, and a limiting viscosity was measured at 135° C. using an Ubbelohde viscometer.

Melting Point (Tm, Unit: ° C.) and Crystallization Temperature (Tc, Unit: ° C.)

A melting point and a crystallization temperature were measured with a thermal analyzer and a differential scanning calorimeter (Diamond DSC, manufactured by Perkin Elmer Inc.) by methods of the following stages 1) to 3). The melting point was determined as an endothermic peak of a heat flow curve observed in the stage 3), and the crystallization temperature was determined as an exothermic peak of a heat flow curve observed in the stage 2).

1) About 10 mg of a sample was held under a nitrogen atmosphere at 150° C. for 5 minutes 2) The sample was cooled from 150° C. to 20° C. (5° C./min) and held for 2 minutes 3) The sample was heated from 20° C. to 150° C. (5° C./min)

A film containing an ethylene-α-olefin copolymer with a small difference (Tm−Tc) between Tm and Tc has excellent slipperiness.

Method for Evaluating Physical Properties of Film

Physical properties of the films of Examples and Comparative Examples were evaluated according to the following method.

Resin Density (Unit: Kg/m$^3$) of Film

A resin density was measured by the A method according to the method specified in JIS K7112-1980. The sample was subjected to annealing described in JIS K6760-1995 before the measurement of the resin density. Then, the resin density of the film was determined based on a weight ratio of the resin contained in the film.

Arithmetic Mean Height Sa (Unit: μm) on Surface of Film

First, a surface of the film was measured with an objective lens at a magnification of 110 times using a white-light interference microscope (manufactured by Hitachi High-Technologies Corporation). Next, the obtained image having a visual field size of 80 μm×60 μm was subjected to a surface correction (inclination correction) using a VS-viewer (manufactured by Hitachi High-Technologies Corporation). Specifically, a surface having the smallest sum of squares of absolute values of unevennesses in a Z direction of a sample surface was calculated, and the surface correction was performed to make the inclined sample surface horizontal. Furthermore, the image subjected to the surface correction was processed by using a value of S-Filter specified in ISO25178-2. Specifically, filter processing was performed with a lateral period limit (½ of optical resolution, 0.17 μm) as a cut-off value, and a noise of a short-wavelength component was removed. Sa specified in ISO25178-2 was determined from the processed image.

Minimum autocorrelation Length Sal (unit: μm) on Surface of Film

Sal specified in ISO25178-2 was determined from the image processed by the same method as that of the arithmetic mean height Sa.

Heat Seal Strength (Unit: N/15 mm) of Film

Inner surfaces of tubes of inflation films obtained in Examples and Comparative Examples were overlapped with each other. The overlapped films were interposed between two nylon films having a thickness of 15 μm and were heat-sealed in a TD direction using a heat sealer (manufactured by TESTER SANGYO CO., LTD.) under the following sealing conditions.

Upper seal bar set temperature: 90° C.
Lower seal bar set temperature: 40° C.
Sealing time: 1 second
Sealing pressure: 0.1 MPa
Sealing width: 10 mm The obtained sample was allowed to stand at 23° C. for 24 hours or longer, and then a test piece having a length of 15 mm was cut out in a direction orthogonal to a sealing width direction. A sealed portion of the cut test piece was peeled off by 180° at a rate of 200 mm/min using a tensile tester to measure heat seal strength.

Opening Strength (unit: N/m$^2$) of Film

The inflation films obtained in Examples were cut out into 10 cm×10 cm, were overlapped with each other so that the insides of the tubes at the time of forming the inflation films were in close contact with each other, and were allowed to stand at a load of 100 g/cm$^2$ in an oven adjusted to 60° C. for 24 hours. After the standing, opening strength was measured as the amount of load required to peel off the inflation films in a vertical direction at a peeling load rate of 20 g/min using a Mackenzie Blocking Tester (manufactured by Shimadzu Corporation).

Production of Ethylene-α-Olefin Copolymer (1)

An ethylene-α-olefin copolymer (1) was produced according to the following production examples.

Production Example 1

Production of Component (H)

A component (H) was produced in the same manner as in the production of the component (A) in each of Examples 1 (1) and (2) described in JP-A-2009-79180. As a result of element analysis, Zn was 11% by mass and F was 6.4% by mass.

Production of Pre-Polymerization Catalyst Component 4.15 m$^3$ of butane was added to a previously nitrogen-purged autoclave having an internal volume of 9,000 liters and equipped with a stirrer, 6.0 mol of racemic-ethylenebis (1-indenyl)zirconium diphenoxide was added thereto, the autoclave was heated to 50° C., and then the mixture was stirred for 2 hours. Next, 60.4 kg of the produced component (H) was added to the autoclave. Thereafter, the autoclave was cooled to 30° C., the system was stabilized, 5 kg of ethylene and 5 liters of hydrogen (normal temperature and normal pressure) were added to the autoclave, 35.1 L of a hexane solution obtained by diluting triisobutylaluminum with n-hexane at 20 wt % was subsequently added, and then pre-polymerization was started. Each of ethylene and hydrogen (normal temperature and normal pressure) was supplied to the autoclave at 60 kg/hr and 30 liter/hr for 30 minutes, and then each of ethylene and hydrogen (normal temperature and normal pressure) was supplied to the autoclave at 159 kg/hr and 0.54 m$^3$/hr while heating the autoclave to 50° C. A total of 15.4 hours of the pre-polymerization was carried out. After completion of the pre-polymerization, ethylene, butane, hydrogen, or the like was purged, and the remaining solid was vacuum-dried at room temperature, thereby obtaining a pre-polymerization catalyst component containing 41.1 g of polyethylene per 1 g of the component (H). [η] of the polyethylene was 1.21 dl/g. Thereafter, the resulting pre-polymerization catalyst component was injected into a Hi-Bolter with a mesh having an opening of 162 μm (manufactured by TOYO HITEC Co., LTD.), and fine powder was removed under a nitrogen atmosphere, thereby obtaining a pre-polymerization catalyst component from which the fine pre-polymerization catalyst components were removed.

Production of Polymer

In the presence of the resulting pre-polymerization catalyst component, copolymerization of ethylene, 1-butene, and 1-hexene was carried out in a continuous fluidized bed gas phase polymerization apparatus to obtain ethylene-1-butene-1-hexene copolymer (hereinafter, referred to as LLDPE 1-1) powder. As polymerization conditions, a polymerization temperature was set to 89° C., a polymerization pressure was set to 2 MPa, an average ratio of the amount of hydrogen with respect to 100 mol % of ethylene was set to 0.33%, and a molar ratio of 1-butene and a molar ratio of 1-hexene with respect to a sum of ethylene, 1-butene, and 1-hexene were set to 1.33% and 0.53%, respectively. During the polymerization, ethylene, 1-butene, 1-hexene, and hydrogen were continuously supplied to maintain a gas composition constant. In addition, the pre-polymerization catalyst component, triisobutylaluminum (a molar ratio of triisobutylaluminum with respect to a weight of LLDPE 1-1 powder:0.44 mol/t), triethylamine (a molar ratio thereof with respect to triisobutylaluminum:10.2%), and oxygen (a molar ratio thereof with respect to triisobutylaluminum:24%) were continuously supplied. A total powder weight in the fluidized bed was kept constant at 52.9 t. An average polymerization time was 6.6 hr. The LLDPE 1-1 powder was transferred to a hopper through a transfer pipe connecting the continuous fluidized bed gas phase polymerization apparatus and the hopper to each other. Mixed gas obtained by mixing nitrogen having a flow rate of 250 m$^3$/hr with water having a flow rate of 6 L/hr and heating the mixture at 65° C. was injected to the hopper to bring water into contact with the LLDPE 1-1 powder. The time for contact with water in the hopper was 1.3 hours. The LLDPE 1-1 powder in contact with water was transferred to another hopper through a transfer pipe, and the LLDPE 1-1 powder was dried by circulating nitrogen in the hopper. The dried LLDPE 1-1 powder was granulated under conditions of a feed rate of 50 kg/hr, a screw rotational speed of 450 rpm, a gate opening degree of 50%, a suction pressure of 0.1 MPa, and a resin temperature of 200° C. to 230° C. using an extruder (LCM50, manufactured by KOBE STEEL, LTD.) to obtain LLDPE 1-1 pellets. Physical properties of the resulting LLDPE 1-1 pellets were evaluated. The results are shown in Table 1.

Production Example 2

Production of Pre-Polymerization Catalyst Component 41 liters of butane was added to a previously nitrogen-purged autoclave having an internal volume of 210 liters and equipped with a stirrer, 60.9 mmol of racemic-ethylenebis (1-indenyl)zirconium diphenoxide was added thereto, the autoclave was heated to 50° C., and then the mixture was stirred for 2 hours. Next, 0.60 kg of the component (H) obtained in Production Example 1 was added to the autoclave. Thereafter, the autoclave was cooled to 31° C., the system was stabilized, 0.1 kg of ethylene and 0.1 liters of hydrogen (normal temperature and normal pressure) were added to the autoclave, 240 mmol of triisobutylaluminum was subsequently added, and then pre-polymerization was started. Each of ethylene and hydrogen (normal temperature and normal pressure) was supplied to the autoclave at 0.5 kg/hr and 1.1 liter/hr for 30 minutes, and then each of ethylene and hydrogen (normal temperature and normal pressure) was supplied to the autoclave at 2.7 kg/hr and 8.2 liter/hr while heating the autoclave to 50° C. A total of 10.0 hours of the pre-polymerization was carried out. After completion of the pre-polymerization, ethylene, butane, hydrogen, or the like was purged, and the remaining solid was vacuum-dried at room temperature, thereby obtaining a pre-polymerization catalyst component containing 39.6 g of polyethylene per 1 g of the component (H). [η] of the polyethylene was 1.17 dl/g.

Production of Polymer

In the presence of the resulting pre-polymerization catalyst component, copolymerization of ethylene and 1-hexene was carried out in a continuous fluidized bed gas phase polymerization apparatus to obtain ethylene-1-hexene copolymer (hereinafter, referred to as LLDPE 1-2) powder. As polymerization conditions, a polymerization temperature was set to 96° C., a polymerization pressure was set to 2 MPa, an average ratio of the amount of hydrogen with respect to 100 mol % of ethylene was set to 0.56%, and a molar ratio of 1-hexene with respect to a sum of ethylene and 1-hexene was set to 1.09%. During the polymerization, ethylene, 1-hexene, and hydrogen were continuously supplied to maintain a gas composition constant. In addition, the pre-polymerization catalyst component, triisobutylalumi-num, triethylamine (a molar ratio thereof with respect to triisobutylaluminum:30%), and oxygen (a molar ratio thereof with respect to triisobutylaluminum:12%) were continuously supplied. A total powder weight in the fluidized bed was kept constant at 80 kg. An average polymerization time was 3.4 hr. The resulting LLDPE 1-2 powder was transferred to a hopper through a transfer pipe connecting the continuous fluidized bed gas phase polymerization apparatus and the hopper to each other. Methanol at room temperature was injected to the hopper to bring methanol into contact with the LLDPE 1-2 powder. The time for contact with water in the hopper was 1 hour. The LLDPE 1-2 powder in contact with methanol was transferred to another hopper through a transfer pipe, and the LLDPE 1-2 powder was dried by circulating nitrogen in the hopper. The dried LLDPE 1-2 powder was granulated under conditions of a feed rate of 50 kg/hr, a screw rotational speed of 450 rpm, a gate opening degree of 50%, a suction pressure of 0.1 MPa, and a resin temperature of 200° C. to 230° C. using an extruder (LCM50, manufactured by KOBE STEEL, LTD.) to obtain LLDPE 1-2 pellets. Physical properties of the resulting LLDPE 1-2 pellets were evaluated. The results are shown in Table 1.

TABLE 1

| Ethylene-α-olefin copolymer (1) | | LLDPE 1-1 | LLDPE 1-2 |
| --- | --- | --- | --- |
| MFR | g/10 min | 0.078 | 0.021 |
| Density | kg/m$^3$ | 927.0 | 924.5 |
| Mw | g/mol | 124148 | 125865 |
| Mw/Mn | — | 7.8 | 6.5 |
| [η] | dl/g | 1.34 | 1.44 |
| Tm | ° C. | 112.6 | 111.9 |
| Tc | ° C. | 106.9 | 106.0 |
| Tm − Tc | ° C. | 5.7 | 5.9 |

Formation of Inflation Film

The following copolymers were used as an ethylene-α-olefin copolymer (2).

Ethylene-1-Hexene Copolymer 2-1 (LLDPE 2-1): metallocene catalyst linear low density polyethylene EXCELLEN FX FX307 (manufactured by Sumitomo Chemical Co., Ltd., ethylene-1-hexene copolymer, MFR: 3.1 g/10 min, density: 889.1 kg/m$^3$, Mw: 74,517, Mw/Mn: 1.8)

Ethylene-1-hexene copolymer 2-2 (LLDPE 2-2): metallocene catalyst linear low density polyethylene SUMI-KACENE E EV203N (manufactured by Sumitomo Chemical Co., Ltd., ethylene-1-hexene copolymer, MFR: 2.0 g/10 min, density: 913.0 kg/m$^3$, Mw: 84,482, Mw/Mn: 2.0)

The used anti-blocking agent and lubricant were as follows.

Anti-blocking agent masterbatch (AB-MB): manufactured by Japan Polyethylene Corporation, KMB32F, MFR of resin contained in AB-MB: 3.8 g/10 min Lubricant masterbatch (SA-MB): manufactured by Prime Polymer Co., Ltd., ESQ-4, MFR of resin contained in SA-MB: 1.5 g/10 min Example 1

The LLDPE 1-1, the LLDPE 2-1, the anti-blocking agent masterbatch, and the lubricant masterbatch were mixed with each other with a mixing composition shown in Table 2 by a tumble mixer. Next, the resulting mixture was processed using an inflation film forming machine (manufactured by Placo Co., Ltd.) (EXU type single screw extruder, a dice (die diameter: 125 mmφ, lip gap: 2.0 mm), single slit airing with an iris) under processing conditions of a processing temperature of 170° C., an extrusion amount of 25 kg/hr, a frost line distance (FLD) of 250 mm, and a blow ratio of 1.8, thereby forming an inflation film having a thickness of 70 μm. Physical properties of the resulting inflation film are shown in Table 2.

The configuration of the compression section of the screw included in the inflation film forming machine used in the present Example is as illustrated in FIG. 1. Specific conditions will be described below.

Heating cylinder diameter (D): 50.25 mm
Length of screw to diameter of heating cylinder (L/D): 28
Total pitch: 28
Pitch in feed section: 7
Pitch in compression section: 16
Pitch in metering section: 1
Pitch in barrier portion: 4
Length of 1 pitch (distance between pitches): 50.0 mm
Groove depth at feed section: 5.5 mm (constant)
Groove depth at compression section: maximum value 5.5 mm/minimum value 1.2 mm
Groove depth at metering section: 3.5 mm (constant)
Compression ratio: 1.5

Example 2

An inflation film was obtained in the same manner as that of Example 1, except that the LLDPE 1-1, the LLDPE 2-1, the anti-blocking agent masterbatch, and the lubricant masterbatch were mixed with each other with a mixing composition shown in Table 2 by a tumble mixer. Physical properties of the resulting inflation film are shown in Table 2.

Example 3

An inflation film was obtained in the same manner as that of Example 1, except that the LLDPE 1-1, the LLDPE 2-1, the anti-blocking agent masterbatch, and the lubricant masterbatch were mixed with each other with a mixing composition shown in Table 2 by a tumble mixer. Physical properties of the resulting inflation film are shown in Table 2.

Comparative Example 1

The LLDPE 1-1, the LLDPE 2-1, the anti-blocking agent masterbatch, and the lubricant masterbatch were mixed with each other with a mixing composition shown in Table 2 by a tumble mixer. Next, the resulting mixture was processed using an inflation film forming machine (manufactured by Placo Co., Ltd.) (full flight type single screw extruder, a dice (die diameter: 50 mmφ, lip gap: 2.0 mm), double slit airing) under processing conditions of a processing temperature of 170° C., an extrusion amount of 5.5 kg/hr, a frost line distance (FLD) of 200 mm, and a blow ratio of 1.8, thereby forming an inflation film having a thickness of 70 μm. Physical properties of the resulting inflation film are shown in Table 2.

Figure 2:
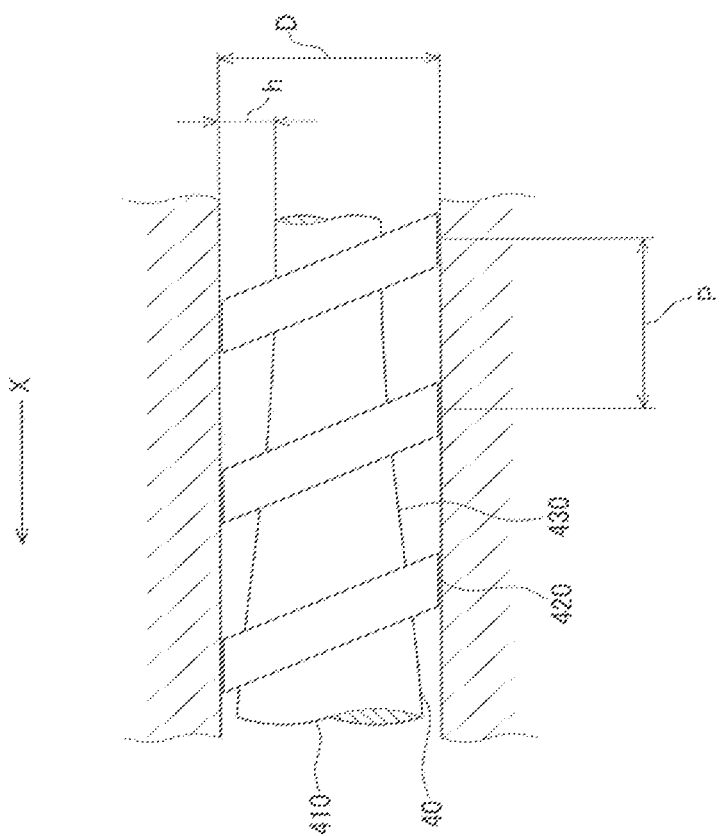
FIG. 2 is a view schematically illustrating a part of a compression section of a screw in Comparative Example.

Hereinafter, the configuration of the compression section of the screw included in the inflation film forming machine used in the present Comparative Example will be described using FIG. 2. A compression section 40 includes a rotary main shaft 410 and a spiral blade 420 spirally formed on an outer circumference of the rotary main shaft 410. The rotary main shaft 410 has one spiral groove portion 430 constituting a spiral groove arranged between the pitches of the spiral blade 420. The spiral groove portion 430 in the compression section 40 is formed so that a groove depth (h) thereof gradually decreases in a moving direction (direction indicated by the arrow X illustrated in FIG. 1) of the mixture as a whole. Specific conditions will be described below.

Heating cylinder diameter (D): 30.0 mm
Length of screw to diameter of heating cylinder (L/D): 26
Total pitch: 26
Pitch in feed section: 8
Pitch in compression section: 10
Pitch in metering section: 8
Length of 1 pitch (distance between pitches): 30.0 mm
Groove depth at feed section: 5.2 mm (constant)
Groove depth at compression section: maximum value 5.2 mm/minimum value 1.5 mm
Groove depth at metering section: 1.5 mm (constant)
Groove depth ratio: 3.5

Comparative Example 2

An inflation film was obtained in the same manner as that of Comparative Example 1, except that the LLDPE 1-1, the LLDPE 2-1, the anti-blocking agent masterbatch, and the lubricant masterbatch were mixed with each other with a mixing composition shown in Table 2 by a tumble mixer. Physical properties of the resulting inflation film are shown in Table 2.

Comparative Example 3

An inflation film was obtained in the same manner as that of Comparative Example 1, except that the LLDPE 1-2, the LLDPE 2-2, the anti-blocking agent masterbatch, and the lubricant masterbatch were mixed with each other with a mixing composition shown in Table 2 by a tumble mixer. Physical properties of the resulting inflation film are shown in Table 2.

TABLE 2

|  |  |  | Example 1 | Example 2 | Example 3 | Comparative Example 1 | Comparative Example 2 | Comparative Example 3 |
| --- | --- | --- | --- | --- | --- | --- | --- | --- |
| Ethylene-α-olefin copolymer (1) | Composition (% by mass) | LLDPE 1-1 | 22.1 | 11.1 | 8.3 | 11.1 | 33.2 | — |
|  |  | LLDPE 1-2 | — | — | — | — | — | 22.1 |
|  | Density (kg/m$^3$) |  | 927.0 | 927.0 | 927.0 | 927.0 | 927.0 | 924.5 |
| Ethylene-α-olefin copolymer (2) | Composition (% by mass) | LLDPE 2-1 | 77.9 | 88.9 | 91.7 | 88.9 | 66.8 | — |
|  |  | LLDPE 2-2 | — | — | — | — | — | 77.9 |
|  | Density (kg/m$^3$) |  | 889.1 | 889.1 | 889.1 | 889.1 | 889.1 | 913.0 |
| Anti-blocking agent masterbatch | Composition (% by mass) | AB-MB (in resin) |  |  |  | 5.6 (3.8) |  |  |
|  | Resin density (kg/m$^3$) |  |  |  |  | 911 |  |  |
| Lubricant masterbatch | Composition (% by mass) | SA-MB (in resin) |  |  |  | 4.0 (3.8) |  |  |
|  | Resin density (kg/m$^3$) |  |  |  |  | 924 |  |  |

TABLE 2-continued

|  |  | Example 1 | Example 2 | Example 3 | Comparative Example 1 | Comparative Example 2 | Comparative Example 3 |
| --- | --- | --- | --- | --- | --- | --- | --- |
| Production method | Extruder | EXU type screw | | | Full flight type screw | | |
| Physical properties of film | Resin density (kg/m$^3$) | 897 | 893 | 892 | 893 | 900 | 915 |
|  | Sa (μm) | 0.187 | 0.137 | 0.147 | 0.080 | 0.245 | 0.134 |
|  | Sal (μm) | 8.87 | 7.67 | 10.08 | 6.66 | 10.52 | 8.82 |
| Effect | Opening strength (N/m$^2$) | 148.9 | 205.9 | 182.4 | 363.8 | 71.5 | 72.7 |
|  | Heat seal strength (N/15 mm) | 6.7 | 7.6 | 6.6 | 7.7 | 1.8 | 0.1 |

As can be seen from the results shown in Table 2, the balance between the heat seal strength and the opening strength is excellent in the film of each Example satisfying the composition requirements of the present invention was excellent.

On the other hand, Sa of the film of Comparative Example 1 is less than 0.10 μm, and thus, the film of Comparative Example 1 has high opening strength.

Sal of the film of Comparative Example 2 exceeds 10.4 μm, and thus, the film of Comparative Example 2 has low heat seal strength.

The resin density of the film of Comparative Example 3 exceeds 900 kg/m$^3$, and thus, the film of Comparative Example 3 has low heat seal strength.

The invention claimed is:

1. A film comprising a resin,
   wherein a resin density of the film is 860 kg/m$^3$ or more and less than 900 kg/m$^3$, and
   on at least one surface of the film, an arithmetic mean height Sa satisfies the following Expression [1]:

$$0.10\ \mu m \leq Sa \leq 0.50\ \mu m \qquad [1], \text{ and}$$

a minimum autocorrelation length Sal satisfies the following Expression [2], $$0.2\ \mu m \leq Sal \leq 10.4\ \mu m \qquad [2].$$

2. The film according to claim 1, wherein an arithmetic mean height Sa on the at least one surface of the film satisfies the following Expression [1']:

$$0.10\ \mu m \leq Sa \leq 0.20\ \mu m \qquad [1'].$$

3. The film according to claim 2, wherein a minimum autocorrelation length Sal on the at least one surface of the film satisfies the following Expression [2']:

$$7.0\ \mu m \leq Sal \leq 10.4\ \mu m \qquad [2'].$$

4. The film according to claim 3, wherein a resin density of the film is 890 kg/m$^3$ or more and less than 900 kg/m$^3$.

5. The film according to claim 4, wherein the resin is a mixture of
   an ethylene-α-olefin copolymer (1) having a monomer unit based on ethylene and a monomer unit based on an α-olefin having 3 to 20 carbon atoms, having a density of 915 kg/m$^3$ or more and 950 kg/m$^3$ or less, and having a melt flow rate of 0.0001 g/10 min or more and 0.2 g/10 min or less measured under conditions of a temperature of 190° C. and a load of 21.18 N, and
   an ethylene-α-olefin copolymer (2) having a monomer unit based on ethylene and a monomer unit based on an α-olefin having 3 to 20 carbon atoms, having a density of 850 kg/m$^3$ or more and less than 890 kg/m$^3$, and having a melt flow rate of 0.1 g/10 min or more and 10 g/10 min or less measured under conditions of a temperature of 190° C. and a load of 21.18 N.

6. The film according to claim 3, wherein the resin is a mixture of
   an ethylene-α-olefin copolymer (1) having a monomer unit based on ethylene and a monomer unit based on an α-olefin having 3 to 20 carbon atoms, having a density of 915 kg/m$^3$ or more and 950 kg/m$^3$ or less, and having a melt flow rate of 0.0001 g/10 min or more and 0.2 g/10 min or less measured under conditions of a temperature of 190° C. and a load of 21.18 N, and
   an ethylene-α-olefin copolymer (2) having a monomer unit based on ethylene and a monomer unit based on an α-olefin having 3 to 20 carbon atoms, having a density of 850 kg/m$^3$ or more and less than 890 kg/m$^3$, and having a melt flow rate of 0.1 g/10 min or more and 10 g/10 min or less measured under conditions of a temperature of 190° C. and a load of 21.18 N.

7. The film according to claim 1, wherein a minimum autocorrelation length Sal on the at least one surface of the film satisfies the following Expression [2']:

$$7.0\ \mu m \leq Sal \leq 10.4\ \mu m \qquad [2'].$$

8. The film according to claim 1, wherein a resin density of the film is 890 kg/m$^3$ or more and less than 900 kg/m$^3$.

9. The film according to claim 1, wherein the resin is a mixture of an ethylene-α-olefin copolymer (1) having a monomer unit based on ethylene and a monomer unit based on an α-olefin having 3 to 20 carbon atoms, having a density of 915 kg/m$^3$ or more and 950 kg/m$^3$ or less, and having a melt flow rate of 0.0001 g/10 min or more and 0.2 g/10 min or less measured under conditions of a temperature of 190° C. and a load of 21.18 N, and
   an ethylene-α-olefin copolymer (2) having a monomer unit based on ethylene and a monomer unit based on an α-olefin having 3 to 20 carbon atoms, having a density of 850 kg/m$^3$ or more and less than 890 kg/m$^3$, and having a melt flow rate of 0.1 g/10 min or more and 10 g/10 min or less measured under conditions of a temperature of 190° C. and a load of 21.18 N.

10. The film according to claim 9,
    wherein a density of the ethylene-α-olefin copolymer (1) is 920 kg/m$^3$ or more and 935 kg/m$^3$ or less, and a melt flow rate of the ethylene-α-olefin copolymer (1) measured under conditions of a temperature of 190° C. and a load of 21.18 N is 0.001 g/10 min or more and 0.01 g/10 min or less, and
    a density of the ethylene-α-olefin copolymer (2) is 880 kg/m$^3$ or more and less than 890 kg/m$^3$, and a melt flow rate of the ethylene-α-olefin copolymer (2) measured under conditions of a temperature of 190° C. and a load of 21.18 N is 1 g/10 min or more and 5 g/10 min or less.

11. The film according to claim 10,
    wherein a content of the ethylene-α-olefin copolymer (1) and a content of the ethylene-α-olefin copolymer (2)

are 5% by mass or more and 25% by mass or less and 75% by mass or more and 95% by mass or less, respectively, with respect to a total of 100% by mass of the content of the ethylene-α-olefin copolymer (1) and the content of the ethylene-α-olefin copolymer (2).

12. The film according to claim 9, wherein a content of the ethylene-α-olefin copolymer (1) and a content of the ethylene-α-olefin copolymer (2) are 5% by mass or more and 25% by mass or less and 75% by mass or more and 95% by mass or less, respectively, with respect to a total of 100% by mass of the content of the ethylene-α-olefin copolymer (1) and the content of the ethylene-α-olefin copolymer (2).

13. A bag obtained by heat-sealing the film according to claim 1.

* * * * *